United States Patent [19]
Blomkvist

[11] Patent Number: 6,099,741
[45] Date of Patent: Aug. 8, 2000

[54] METHOD AND APPARATUS FOR TREATING LIQUID-CONTAINING MATERIAL BASED ON ORGANIC WASTE PRODUCTS

[75] Inventor: Ove Blomkvist, Oslo, Norway

[73] Assignee: Biopartner AS, Tonsberg, Norway

[21] Appl. No.: 09/117,815

[22] PCT Filed: Feb. 12, 1997

[86] PCT No.: PCT/NO97/00041

§ 371 Date: Aug. 10, 1998

§ 102(e) Date: Aug. 10, 1998

[87] PCT Pub. No.: WO97/30008

PCT Pub. Date: Aug. 21, 1997

[30] Foreign Application Priority Data

Feb. 13, 1996 [NO] Norway ...................................... 960566

[51] Int. Cl.[7] .............................. B01D 19/00; B03B 5/36; B01F 7/00
[52] U.S. Cl. ........................... 210/750; 210/218; 210/219; 210/319; 366/289
[58] Field of Search ...................................... 210/749, 750, 210/609, 631, 718, 738, 173, 205, 218, 219, 319; 159/47.1; 366/289, 286; 425/583

[56] References Cited

U.S. PATENT DOCUMENTS

| | | | |
|---|---|---|---|
| 3,788,609 | 1/1974 | Toczyski | 295/5 |
| 4,038,180 | 7/1977 | Talbert . | |
| 4,055,494 | 10/1977 | Emmett, Jr. | 210/738 |
| 5,139,667 | 8/1992 | Reneau, Jr. | 210/319 |

FOREIGN PATENT DOCUMENTS

| | | |
|---|---|---|
| 0 356 781 | 3/1990 | European Pat. Off. . |
| 30 32 887 | 4/1981 | Germany . |
| 35 46 274 | 7/1987 | Germany . |
| 1521672 | 8/1978 | United Kingdom . |
| 81/02888 | 10/1981 | WIPO . |

*Primary Examiner*—David A. Simmons
*Assistant Examiner*—Frank M. Lawrence
*Attorney, Agent, or Firm*—Griffin, Butler, Whisenhunt & Szipl. LLP

[57] ABSTRACT

Liquid containing organic waste material and chemicals are continually introduced into the upper part of a vertical, cylindical treatment chamber. While sinking through the chamber, the material is beaten by fast rotating treating elements which also mix the material. The treating elements also move in axial direction to free vapors and gases from the material. Vapors and gases are removed from the top of the chamber.

15 Claims, 4 Drawing Sheets

6,099,741

METHOD AND APPARATUS FOR TREATING LIQUID-CONTAINING MATERIAL BASED ON ORGANIC WASTE PRODUCTS

The invention relates to a method and apparatus for treating liquid-containing materials based on organic waste products, particularly sludge from sewage plants. The treatment is carried out with the particular aim to make the material suitable as a fertiliser or soil improvement medium.

BACKGROUND OF THE INVENTION

Prior treatment plants are based on batchwise feeding of the material into a treatment chamber into which chemicals are added. The chemical additives cause reactions in the material resulting in heat generation and evaporation of liquid regulation of the pH value and increase of nitrogen in the final product. Then heat is added to the thus chemically treated mass to evaporate liquid and to achieve a desired percentage of solid matter in the final product.

This prior technique suffers from several drawbacks and deficiencies. Thus, batchwise treatment is not an effective approach. Also, the relatively high temperatures as used (about 425° C.) result in destruction of humic acid and other substances important to soil improvement.

Furthermore, when the reaction processes take place within the mass, gasification of liquid is hampered and the results of the reaction processes generally lowered. Using external heat for gasification/drying and granulation after reaction treatment the temperature should be sufficiently low to avoid loss of the material substances that are valuable to soil improvement. Various low temperature technology processes may be adapted to this process. However, the properties of the material emanating from the reaction treatment would be of great importance, also for the result of this process.

The prior art also includes continuous processes for treating liquid-containing materials such as sewage sludge, as disclosed in U.S. Pat. No. 4,038,180 and EP-A-0 356 781. However, such prior processes suffer from the same drawbacks as discussed above in connection with batchwise material feeding, and in addition they tend to be less efficient owing to the slow throughput needed to ensure a sufficient sludge dwell time for the required reactions and drying to take place.

The main object of the invention is to provide an approach that permits a continuous process, and that does not require external heating of the sludge to effect the necessary evaporation, while keeping the temperature sufficiently low to avoid loss of any of the substances in the material that are valuable for improving soil.

According to the invention this object is achieved through a method and an apparatus as defined in the accompanying patent claims.

SUMMARY OF THE INVENTION

The reaction processes are activated when the material is being directly beaten by the rotating beating means as it falls through the vertical treatment chamber. Liquid and air are beaten out of the pores of the particles in the solid mass, and compact, free particles are formed under conditions promoting degasification. Also, the liberated liquid presents a relatively large surface promoting evaporation and degasification together with a cooling effect serving to keep the temperature sufficiently low, while the heat developed by the chemical reactions is sufficient to produce the desired evaporation. In a such continuous process free liquid surrounding the particles will effectively absorb heat energy supplied. Also, with compact particles, one is far more free in choosing granulating or pelletising equipment.

BRIEF DESCRIPTION OF THE DRAWINGS

The invention will now be described in more detail below, with reference to the drawings in which.

DESCRIPTION OF PREFERRED EMBODIMENTS

Figure 1:
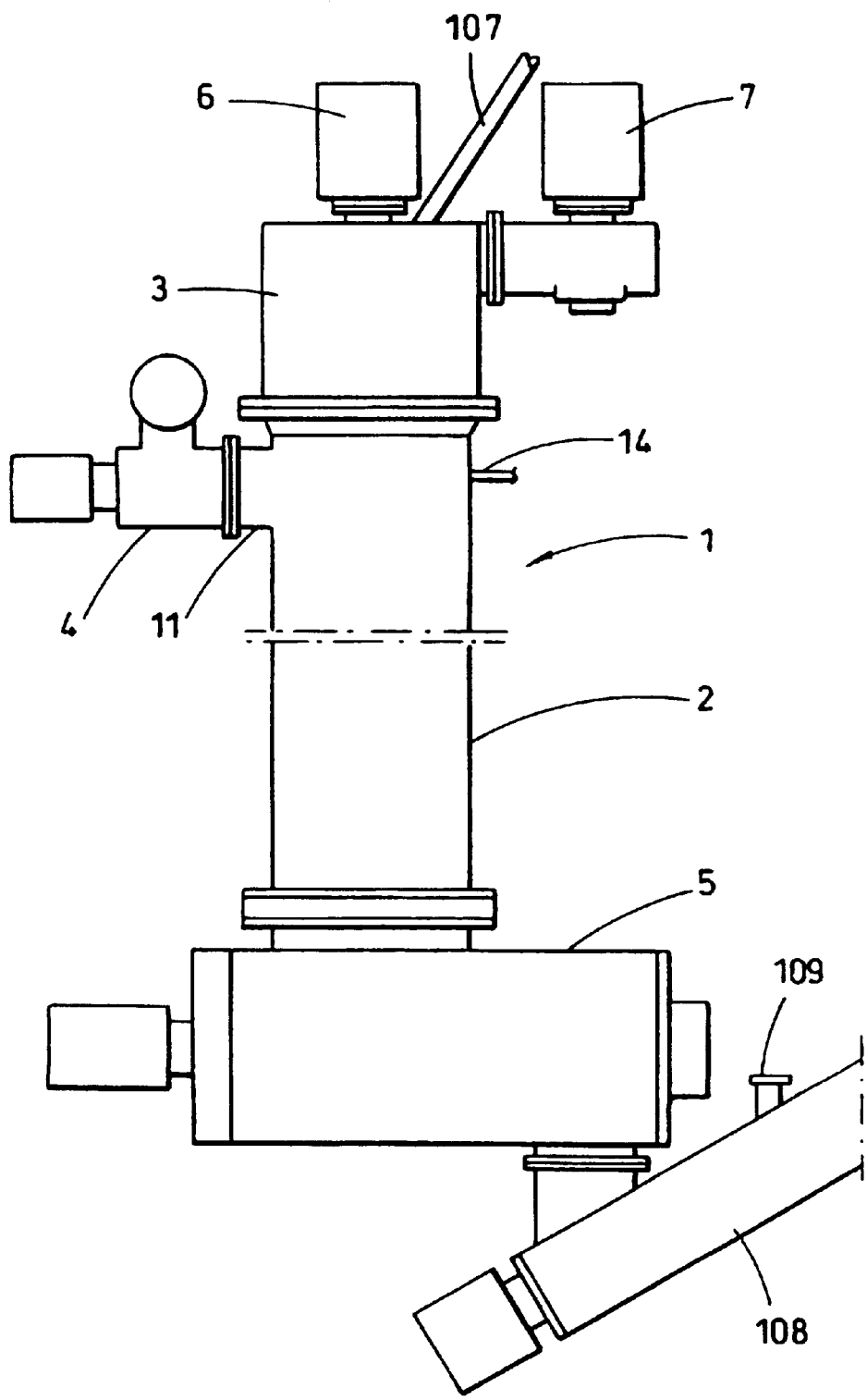
FIG. 1 is an elevational view of an apparatus according to the invention suitable for treating e.g. sewage sludge.

With reference to FIG. 1, the apparatus 1 according to the invention generally comprises a material treatment chamber 2 having an upper gas withdrawal portion 3, a material feed assembly 4, a material discharge assembly 5 and two drive assemblies 6, 7.

Figure 2:
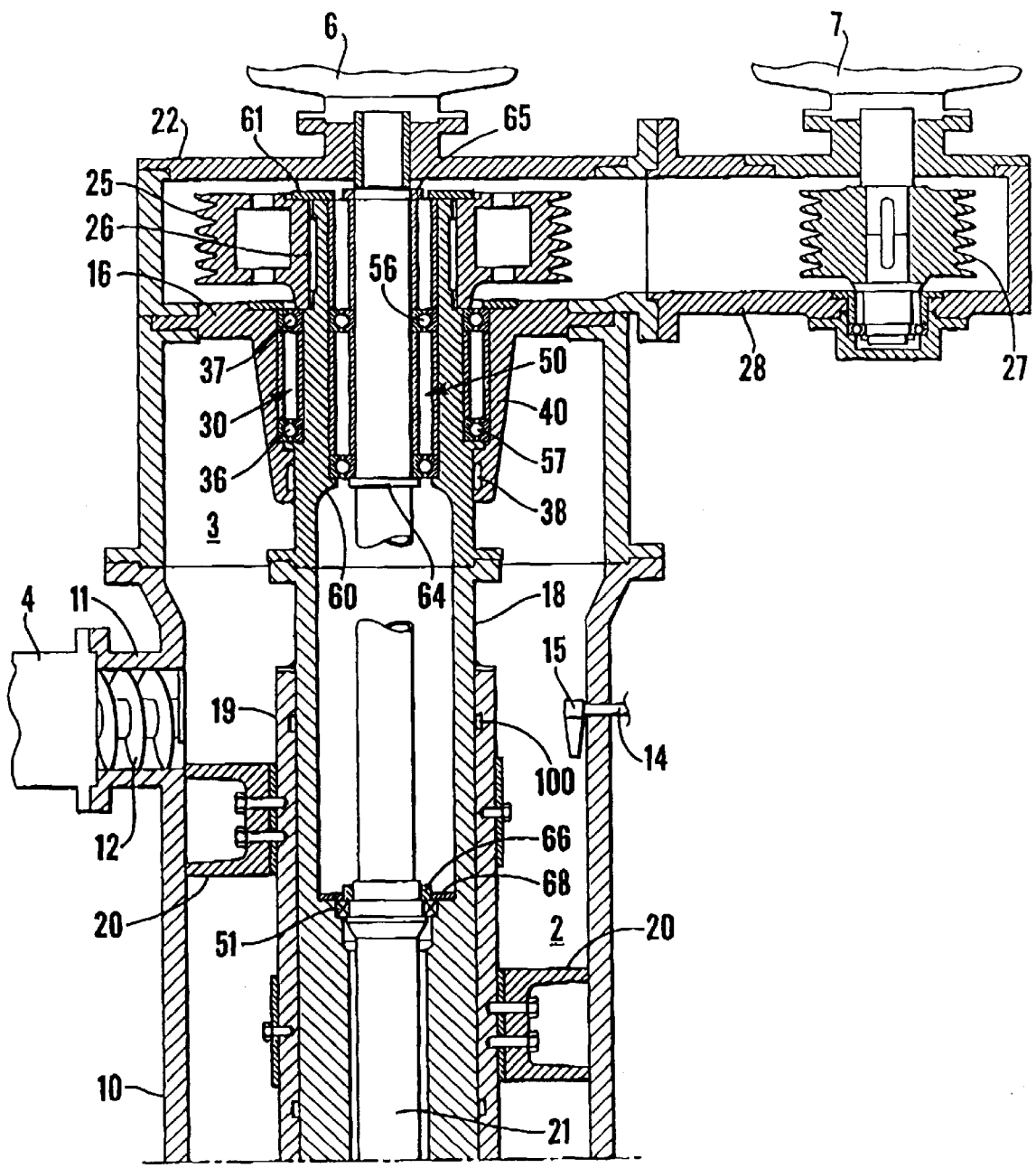
FIGS. 2 and 3 are successive, enlarged longitudinal sectional views of the apparatus according to the invention.
Figure 3:
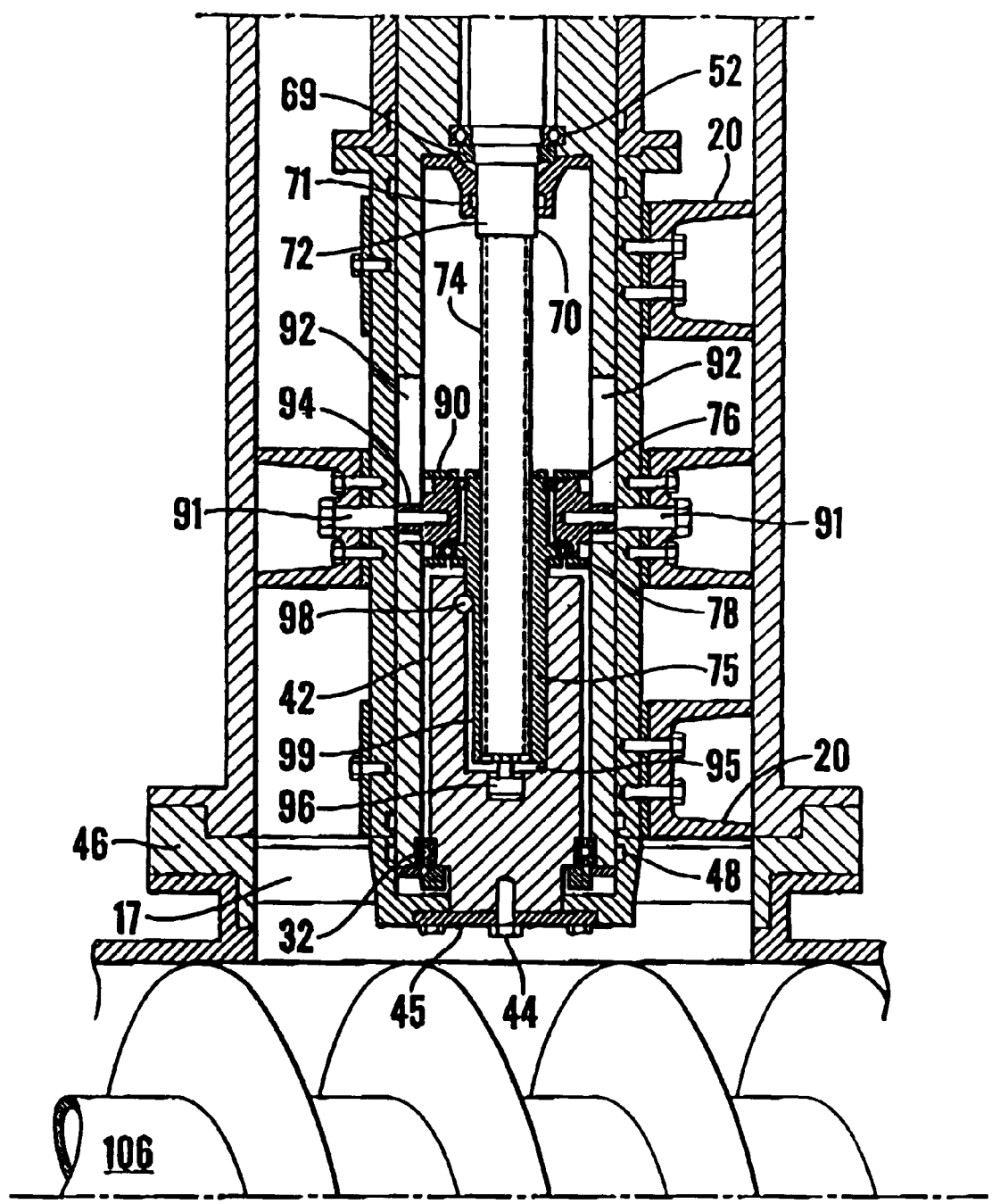

With reference to FIGS. 2 and 3 treatment chamber 2 generally consists of a vertically oriented cylindrical housing 10 which, in the embodiment shown, is conveniently made up of several sections. An inlet 11 provided with a feed screw 12 for feeding material to be treated is disposed in the upper part of the chamber and inlets 14 in the form of vertically directed nozzles 15 for adding chemicals are disposed at the level of or below the material inlet 11. Above inlets 11, 14 the treatment chamber 2 merges into the gas withdrawal portion 3 the top of which is defined by an end wall 16, the bottom of the chamber 2 being defined by an open end or outlet 17.

A tubular body 18 is centrally and rotatably disposed in chamber 2. Rotationally fast with but axially slideably surrounding the tubular body 18 is a shorter tubular sleeve 19 carrying a plurality, e.g. eleven, treating means 20.

Internally of the tubular body 18 there is a shaft 21 which is rotatably journalled in the tubular body independently of the rotation of the tubular body. Shaft 21 extends upwardly through a lop wall 22 of housing 10, where it is connected to an overhead drive unit 6, such as including an electric motor of a type adapted to impart to shaft 21 a periodical, intermittent rotary motion in opposite directions. A pulley 25 disposed between housing top wall 22 and chamber end wall 16 is keyed at 26 to an upper end of tubular sleeve 19 and driven through to a certain transmission via not shown pulleys by a drive pulley 27 located in a housing lateral section 28 also carrying the drive motor 7 for driving the drive pulley 27.

In the embodiment of the invention as shown and described herein the rotational support of the tubular body 18 in the cylinder housing is provided by an upper bearing assembly 30 and a lower bearing 32. In the example as shown the upper bearing assembly is made up of two ball bearings 36, 37 spaced by spacer rings and mounted with their outer raceway rings in the upper end wall 16 of the withdrawal portion upper end wall 16. A seal 38 disposed at the end of a dependent portion 40 of the end wall seals with the outer periphery of tubular body 18.

The bottom bearing 32 is shown as an axial/radial roller bearing the outer raceway ring of which is locked in the lower end of tubular body 18 and the inner raceway ring of which is locked against a shoulder on a cylindrical pedestal 42 internally disposed at the bottom of the tubular body, with a spacing therebetween, and rigidly secured by a central locking screw 44 and locking disk 45 to a spiderlike housing 10 bottom piece 46 that also defines a lower end of treatment chamber 2. A seal 48 internally disposed in bottom piece 46 seals with the exterior of tubular body 18.

The rotational support of shaft 21 in tubular body 18 comprises an upper bearing assembly 50, an intermediate bearing 51 and a lower bearing 52. The upper bearing assembly 50 consists, like the tubular body upper ring assembly 30, of two ball bearings 56, 57 which are spaced by spacer rings and the outer raceway rings of which are locked, via further upper spacer rings, between an internal shoulder 60 of tubular body 18 and a top locking disk 61 also axially locking pulley 25 and upper tubular body bearings 36, 37 inner raceway rings to the tubular body. The inner raceway rings of axial bearings 56, 57 are locked via an upper spacer ring between a collar 64 and a locking ring 65 of shaft 21.

The intermediate bearing 51 is locked in a conventional manner by means of locking ring 66 and locking disk 68 respectively, to shaft 21 and tubular body 18 respectively, while the bottom bearing 52 is locked, also in a conventional manner, to the shaft and tubular body by a locking ring 69 and end cover 70 respectively, the latter being provided with a seal 71 sealing with a portion 72 extending therethrough.

A lower externally threaded extension 74 of shaft 21 co-operate with a longitudinal substantially cylindrical bushing nut 75 having an upper portion which, via bearings 76, 78, are connected to a carrier ring 90 slideably disposed internally of the tubular body and rigidly secured to tubular sleeve 19 by bolts 91 each extending through a respective one of two diametrically opposed, vertically extending slits 92 formed in tubular body 18. In the shown example bolts 91 also extend through a respective treating means 20. A bushing 94 surrounds each bolt 91 between tubular sleeve 19 and carrier ring 90.

A lower end portion of the threaded extension of the shaft depends into a cylindrical bore 95 formed in the pedestal 42 and sized to receive, with a certain clearing, a lower portion of nut 75 in the bottom position thereof as shown in FIG. 3. Shaft 21 has a bottom locating pin 96 received in a mating recess in the bottom of the pedestal bore. In the upper part of the pedestal bore there is a locating lug 98 extending into a mating longitudinal groove 99 in the external periphery of the bushing nut, thus keeping the nut rotationally at rest during rotation of the shaft.

The tubular sleeve 19 is, as previously noted, axially slideable on the exterior of the tubular body 18, e.g. with a radial spacing of about 1.4 mm. Seals 100 seal with the exterior of the tubular body.

When shaft 21 is periodically rotated in opposite directions, nut 75 will move upwardly or downwardly on the shaft, depending on the rotational direction of the shaft, thereby implying to the tubular sleeve, via carrier ring 90 and bolts 91, a corresponding axial motion up and down on the tubular body, with a length of stroke of e.g. 100 mm.

In FIG. 3 nut 75 with tubular sleeve 19 is, as previously noted, shown in a bottom position, while FIG. 2 shows tubular sleeve 19 in its top position.

The treating means 20 mounted on the exterior of the tubular sleeve 19 may have any shape suitable for their purpose, namely to forcefully hit or beat the sludge material during its sinking through the treatment chamber 2, while simultaneously serving to effectively intermix the chemicals added in the chamber into the sludge material.

Figure 4:
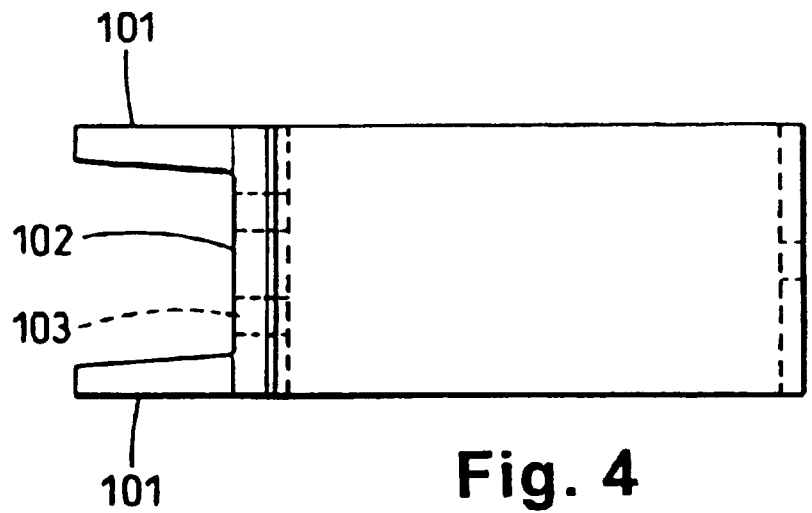
FIGS. 4, 5 and 6 are elevational, plane and crossectional views respectively of details of a treating element.
Figure 5:
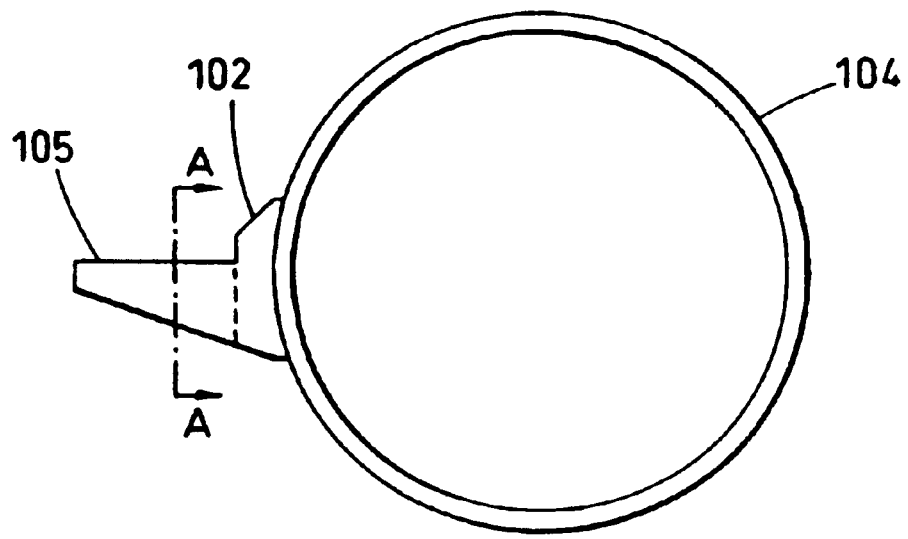
Figure 6:
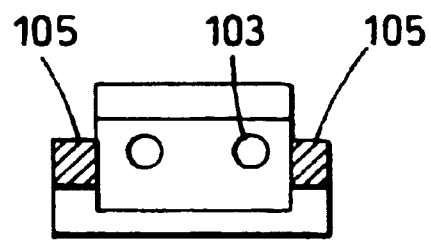

As best shown in FIGS. 4–6 the treating means 20 may consist of a plurality of generally U-shaped elements having two legs or <<teeth>> 101 which, when the elements 20 is mounted on the tubular sleeve, extend radially outwardly toward the internal peripheral surface of the cylindrical housing with a small spacing therebetween, and an intermediate base portion 102 having mounting holes 103 for securing the element to the tubular sleeve. Each element 20 may advantageously be mounted on a carrier ring 104 adapted to be threaded onto the tubular sleeve and secured to the latter by screws. The teeth 101 have a generally flat impact surface 105, i.e. the front surface hitting the sludge material during operation of the apparatus according to the invention. The treating elements 20 are evenly distributed downwardly along the periphery of the tubular sleeve 19, as shown in FIGS. 2 and 3. Preferably, the axial spacing between the elements 20 is somewhat less than the stroke of the nut assembly 75, so that their end positions overlap.

In order to provide for a dwell time of the material in the treatment chamber 2 sufficient to allow the desired chemical reactions to take place in a complete manner, the treatment chamber 2 should have a length of about 2 meters below inlet 11.

The method according to the invention when using the above described apparatus, is substantially as follows.

Having started the drive assemblies 6, 7 the material to be treated, such as sludge, is continuously fed into treatment chamber 2 through inlet 11 by means of feed screw 12, while pressurised concentrated sulphuric or nitric acid is introduced through chemical inlet 14. The sludge sinks by gravity down through the treatment chamber where the porous organic material is exposed to the beating action from the rapidly rotating treating means 20 which also cause a strongly turbulent environment positively serving to intermix the inflowing acid into the material. A suitable rotational speed of tubular sleeve 19 with its treating means is in the range of 1500 and 3000 rpm. Exhaust gases from the chemical reactions thus taking place will flow upwardly in treatment chamber 2 and into the withdrawal portion 3 thence vented through a conduit 107 (FIG. 1) to a condenser, for example, the condensate of which will be suitable for use as a liquid fertiliser. The front surfaces 105 of the treating means 20 will beat out liquid and air trapped in pores in the solid contents of the material and thus effectively separate the liquid from the solid matter, to permit the latter to assume the shape of relatively compact particles, while the separated liquid is liberated for effective evaporation under the influence of the heat generated by the chemical reactions, the vapours and reaction exhaust gases ascending through the degasing portion.

The vertical overlapping travels of the rotating treating means 20 enhance the mixing effect, while the outer end portions of the treating teeth 101 serve as scrapers against the internal surface of the treatment chamber 2, thus keeping the latter free of deposits. The frequency of the periodical vertical motion of the treating means 20 is determined in relation to the percentage of solid content of the material feed, about 3000 cycles per minute being suitable for an initial solid matter content of about 30%.

Then, by means of the conveyor screw 106 of discharge assembly 5 via additional conveyor screw or other suitable means 108, the thus acid-treated material is carried into the inlet of a further treatment apparatus 1 of the construction shown in FIGS. 1–3 and described above, in which the process is repeated, the only difference being that now ammonium is inserted through the chemical inlet 14 rather than acid. If desired, additional additives to take part in the ammonium treatment are inserted through side inlets 109 in the conveyor screw 108 between the two treatment apparatuses 1—1, continuously proportioning the weight of additives relative to the mass being treated. The amount of added ammonium will normally be about 30% of the weight of acid used, resulting in a nitrogen content in the material of about 10%, and the solid matter content will be raised to about 45%.

Factors of importance to the treatment process, such as temperature, ph value, nitrogen content etc. in the sludge material, is measured continuously or intermittently and are simply controlled by controlling the speed of feed of the material and the amount of chemicals.

I claim:

1. In a method for treating a liquid-containing organic waste material comprising the steps of: continuously feeding the material into an upper inlet (11) of a substantially vertical, cylindrical treatment chamber (2); adding treatment chemicals to the material through a chemical inlet (14) on the chamber; mixing the materials and chemicals; heating the mixture to evaporate the liquid and degas the material so as to render the material into a higher solids content; and removing from the chamber evaporated liquid and gases; and wherein the mixing step is carried out by a plurality of beaters (20) mounted on a tubular sleeve (19) which is axially slideable on an exterior of and rotatable about a tubular body (18), said beaters (20) extending essentially to adjacent an inner cylindrical periphery of the chamber, whereby the sleeve (19) is simultaneously rotated about and reciprocated in an axial direction on the tubular body (18).

2. The method of claim 1, wherein the treatment chemicals include at least one acid, the acid and material are fed into the chamber, and the treated material is discharged from the chamber into an additional chamber in which ammonium is inserted.

3. The method of claim 1, wherein the evaporated liquid and gases are condensed into a liquid fertilizer.

4. The method of claim 1, wherein the tubular sleeve is rotated at not more than 3,000 rpm.

5. The method of claim 4, wherein the tubular sleeve is rotated at 1,500–3,000 rpm.

6. The method of claim 5, wherein the tubular sleeve is rotated at about 3,000 rpm.

7. The method of claim 1, wherein the material is caused to sink by gravity down through the chamber (2) from an outlet (17) and is caused to pass through said outlet into a conveyor (106) provided under the chamber without passing any essential constriction.

8. The method of claim 2, wherein the material is conveyed towards said additional chamber by means of a conveyor.

9. An apparatus for treating a liquid-containing organic waste material comprising: a substantially vertical, cylindrical treatment chamber (2); an upper material inlet (11) on the chamber; a chemical inlet (14) on the chamber; a mixer disposed within the chamber; and a vent at an upper end of the chamber for venting gas from the chamber, and wherein the mixer comprises a plurality of beaters (20) mounted on a tubular sleeve (19) which is axially slideable on an exterior of and rotatable about a tubular body (18), said beaters (20) extending essentially to adjacent an inner cylindrical periphery of the chamber, such that the sleeve (19) simultaneously is rotatable about and reciprocal in an axially direction on tubular body (18).

10. The apparatus of claim 9, wherein the tubular sleeve (19) is rotationally fixed on the tubular body (18).

11. The apparatus of claim 10, wherein the tubular body (18) is centrally located in the chamber.

12. The apparatus of claim 11, wherein the tubular member (18) coaxially surrounds and is operably connected to an independently rotatable support shaft (21).

13. The apparatus of claim 12, wherein the shaft (21) has a threaded portion (74) cooperating with a nut (75) which is connected to the tubular body (18).

14. The apparatus of claim 13, wherein the connection to the tubular body (18) is by way of bolts (91) extending through vertical slits (92) formed in the tubular body (18).

15. The apparatus of claim 9, wherein the beaters (20) have teeth (101) which extend radially outwardly from sleeve (19) and have a substantially flat impact surface (105).

* * * * *